United States Patent [19]

Ringle

[11] Patent Number: 5,052,705

[45] Date of Patent: Oct. 1, 1991

[54] CONTROLLED ROTARY POWER TRANSFER APPARATUS AND METHOD FOR NON-DRIVEN BICYCLE WHEELS AND THE LIKE

[75] Inventor: Thomas J. Ringle, Tucson, Ariz.

[73] Assignee: Victor Flores, Tucson, Ariz.

[21] Appl. No.: 539,356

[22] Filed: Jun. 15, 1990

[51] Int. Cl.$^5$ .............................................. B62M 1/00
[52] U.S. Cl. .................................. 280/212; 280/230; 280/304.2; 74/417; 74/423
[58] Field of Search .............. 280/230, 236, 238, 259, 280/201, 223, 212, 214, 304.2; 74/417, 423; 180/342

[56] References Cited

U.S. PATENT DOCUMENTS

| | | | |
|---|---|---|---|
| 599,048 | 2/1898 | Turner | 280/214 |
| 1,796,682 | 3/1931 | Bell | |
| 2,232,908 | 2/1941 | Gartner | 280/223 |
| 3,948,542 | 4/1976 | Lukich | 280/226 |
| 3,978,936 | 9/1976 | Schwartz | 180/342 X |
| 4,773,662 | 9/1988 | Phillips | 280/234 |
| 4,895,385 | 1/1990 | Becoat | 280/259 |

FOREIGN PATENT DOCUMENTS 869824 2/1942 France .................... 280/238

Primary Examiner—Charles A. Marmor
Assistant Examiner—Alan M. Kagen
Attorney, Agent, or Firm—Victor Flores

[57] ABSTRACT

A power transfer apparatus for imparting drive motion to followers. The power transfer apparatus mechanically and rotatably communicates with a driven wheel of a vehicle and transfers rotary power to the non-driven wheel of a vehicle. The present invention teaches a power distribution apparatus for mountain bicycles that mechanically and rotatably communicate with a pedal driven wheel and that transfers rotary power to the non-driven wheel to improve the forward propulsion of the mountain bicycle under rough terrain riding conditions. The power transfer apparatus includes a first caliper assembly having a driver idler and an auxiliary free wheeling idler for engaging a pedal driven wheel of a bicycle, a cable drive system coupled to the driver idler transfers drive motion from the driven wheel to a second caliper assembly having a receiver idler that engages the drive motion to the non-driven wheel. The power transfer apparatus is user controlled and is actuated by an actuator coupled to the first and second caliper for controlling engagement of the driver and receiver idlers.

9 Claims, 2 Drawing Sheets

CONTROLLED ROTARY POWER TRANSFER APPARATUS AND METHOD FOR NON-DRIVEN BICYCLE WHEELS AND THE LIKE

FIELD OF THE INVENTION:

This invention relates to a power transfer apparatus for imparting motion to followers. More particularly, the present invention relates to a power transfer apparatus that mechanically and rotatably communicate with a driven wheel of a vehicle and transfers rotary power to the non-driven wheel of the vehicle. Even more particularly, the present invention relates to a power distribution apparatus for bicycles that mechanically and rotatably communicates with a pedal driven wheel and that transfers rotary power to the non-driven wheel.

BACKGROUND OF THE INVENTION

Propulsion of wheels on vehicles has been accomplished in many ways, including, pedal means for unicycles, bicycles, tricycles and motorized means such as those used in motorcycles. In the field of pedal driven vehicles, the unicycle, while providing ease of propulsion, has the serious steering and balancing disadvantage. The tricycle solved the steering and balance problem, but has a rear loading disadvantage that detracts from the combined front end steering and propulsion advantage. The bicycle has provided a compromise solution to the steering and propulsion problem by including a chain and sprocket drive system that propels the rear wheel of the vehicle in conjunction with a handle bar steerable front wheel that results in much more effective propulsion than the unicycle or the tricycle. In an analog manner, the front wheel is a follower of a pedal driven rear wheel.

The bicycle and tricycle have been mimicked in motorized version that enhance the manner of propulsion. The bicycle and its motorized motorcycle equivalent have the common feature whereby the front wheel is non-driven, i.e. the rear wheel is propelled by either the pedals or motor, via a chain and sprocket system. Both suffer in forward propulsion efficiency due to the loading-down effects of the non-driven front wheel under rough, off-road and incline types of riding and driving conditions. In four wheel vehicles, similar inefficiencies have been compensated for by providing a front wheel drive system that propels the vehicle through rough terrain conditions. The systems used by four wheel vehicles are selectable front wheel gear drive systems or factory provided front wheel transmissions. For bicycles, the power deficiency problems have resulted in solutions directed at making the bicycle lighter, adding a wide range of gear ratio drive systems or adding a bike frame and steering structure that complements a rider's power pedaling stance required during rough terrain riding applications.

Prior art patents that teach front wheel drive for bicycles include U.S. Pat. No. 4,773,662, which provides a double-drive system whereby an operator engages a handle bar arm operated chain and sprocket drive system for the front wheel of a bicycle. The '662 apparatus would prove difficult to operate under conditions requiring rear and front power stroke along with directional steering. Further, the arm pedaling effectiveness is questionable under rough terrain or soft soil surfaces. U.S. Pat. No. 3,948,542 provides a solution for a need of additional forward propulsion in the rear wheels of a bicycle in the form of a system having gear, chain and sprockets that operate by movable action of the seat member of a bicycle. U.S. Pat. No. 1,796,682 teaches a pedal and seat driven exercise vehicle having a belt and gear system for translating the steering motion to a front wheel. U.S. Pat. No. 2,232,908 teaches a perambulator embodying means under the control of a rider whereby the front end or rear end, or both may be caused to undulate as the vehicle moves along.

In present bicycle applications, the mountain bike has gained wide popularity for its design that enables a rider to propel over rough terrain very efficiently, mainly due to the low gearing (typically 12 to 30-tooth rear cog, compared to 32–52 tooth rear cog for road bikes), the light weight, the flat handle bars and wider tires. While the above feature allow a rider to engage in the off-road sport, there are some riding conditions where a distributed application of wheel propulsion power, i.e. a combination rear and front propulsion, would prove most advantageous. Similarly advantage is seen in a cross-country motor bike. The presently known drive systems for driving or propelling a bicycle or motorcycle do not provide a solution for the controlled distributed application of the wheel propulsion power between the front non-driven wheel and rear driven wheel.

Thus, a need is seen to exist for a power transfer apparatus that is controllably actuated to distribute rotary power between a normally driven wheel and a non-driven wheel.

A need is further seen to exist for a power transfer apparatus in kit form to fit either bicycles or motorcycles and that is controllably actuated to distribute rotary power between a normally driven wheel and a non-driven wheel.

A need is also seen to exist for a bicycle apparatus and a motorcycle apparatus having a factory provided power transfer apparatus that is controllably actuated to distribute rotary power between a normally driven wheel and a non-driven wheel.

SUMMARY OF THE INVENTION

Accordingly, the primary object of the present invention is to provide a power transfer apparatus that imparts and distributes rotary motion to a follower, such as a non-driven wheel of a bicycle or motorcycle.

A related object of the present invention is to provide a power transfer apparatus, in kit form to fit a bicycle, that is controllably actuated to impart motion from the pedal driven wheel to the non-driven wheel of the bicycle.

Another related object of the present invention is to provide a power transfer apparatus, in kit form to fit a motorcycle, that is controllably actuated to impart motion from the motor driven wheel to the non-driven wheel of the motorcycle.

The foregoing objects are accomplished by providing a first caliper means having a driver idler for engaging a rotating body, said rotating body being a rotary power source; drive means coupled to said driver idler for transferring drive motion from said rotating body; second caliper means having a receiver idler coupled to said drive means for engaging said drive motion to said follower; and actuator means coupled to said first and second caliper means for controlling engagement of said driver and receiver idlers.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
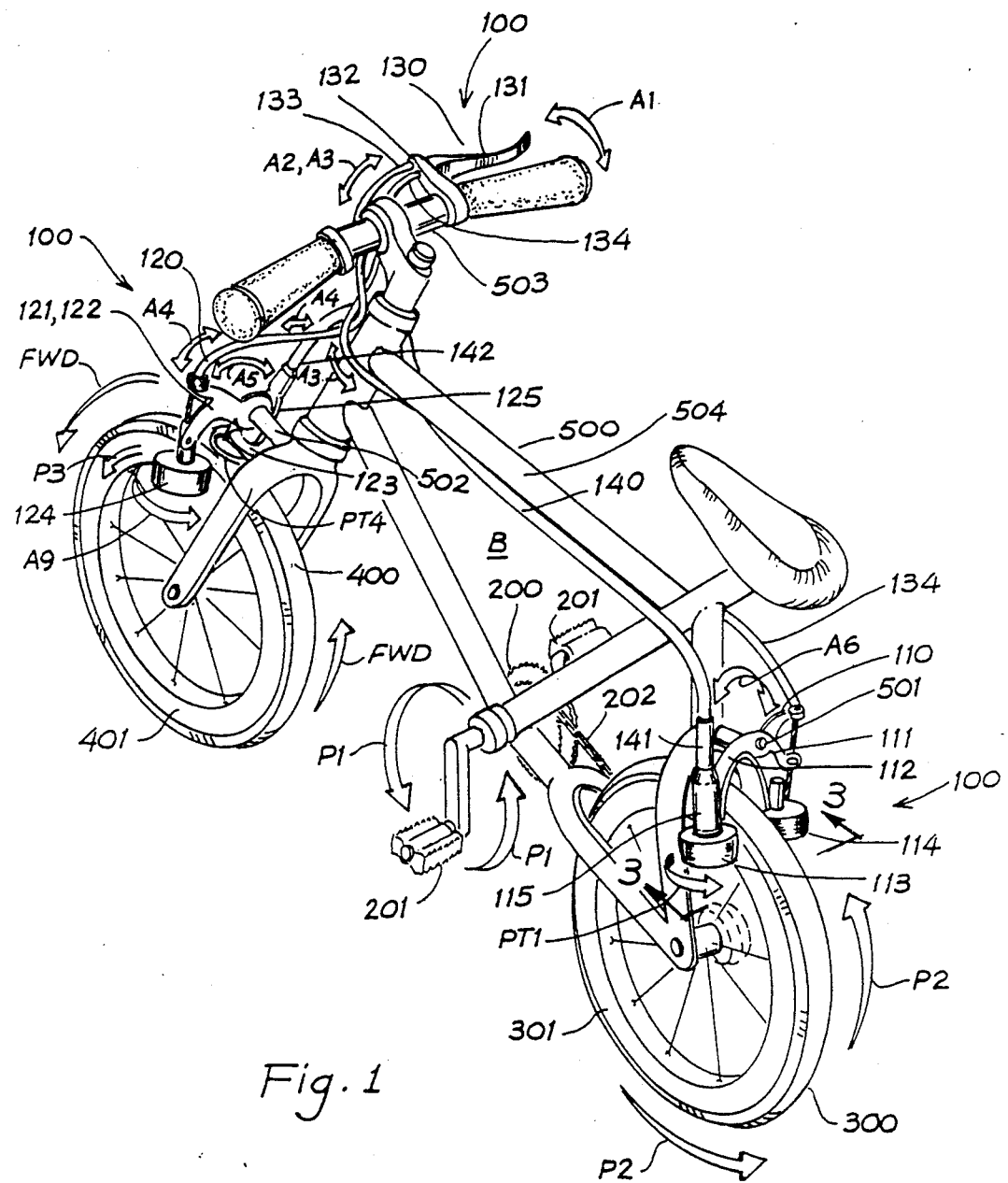
FIG. 1 is a perspective view of a mountain bicycle adapted with the apparatus of the present invention whereby a first caliper means controllably engages a side wall of a rim of a pedal driven wheel to transfer rotary motion to a second caliper means that is controllably engagable with a non-driven wheel member of the bicycle.

Referring now to FIG. 1 where a bicycle B is shown adapted with power transfer apparatus generally designated 100. Power transfer apparatus 100 is comprised of a first caliper means 110, a second caliper means 120, an actuating means 130 and a drive means 140. First caliper means 110 and second caliper means 120 are structurally the same, but differ in function in that one is a driver driven by pedal driven wheel 300 and the other is a receiver and a power booster driver for the front non-driven wheel 400 of bicycle B to effect a propulsion power distribution upon demand. By example, first caliper means 110 comprises lever means 111 and 112, that are responsive to action shown by arrow A1 of actuator handle 131, a driver idler 113, an auxiliary idler 114 and mechanical interface housing 115 that couples to an end 141 of drive means 140. Similarly, second caliper means 120 comprises lever means 121 and 122, that are also responsive to action shown by arrow A1 of actuator handle 131, a driver idler 123, an auxilliary idler 124 and mechanical interface housing 125 that couples to an end 142 of drive means 140. Actuating means 130 comprises a lever 131, a mounting means 132 and a pair of sheathed cables 133 and 134 associated with levers 111, 112 and 121, 122 of the first and second caliper means, respectively. In the preferred embodiment, the power transfer apparatus 100 is mounted to a bicycle frame member 500, whereby the first caliper means 110 is attached to a rear wheel support structure 501, the drive means 140 is looped around interconnecting frame member 504 and terminates by attachment of second caliper means 120 to a front wheel support structure 502. Actuating means 130 is attached to handle bars 503.

Figure 2:
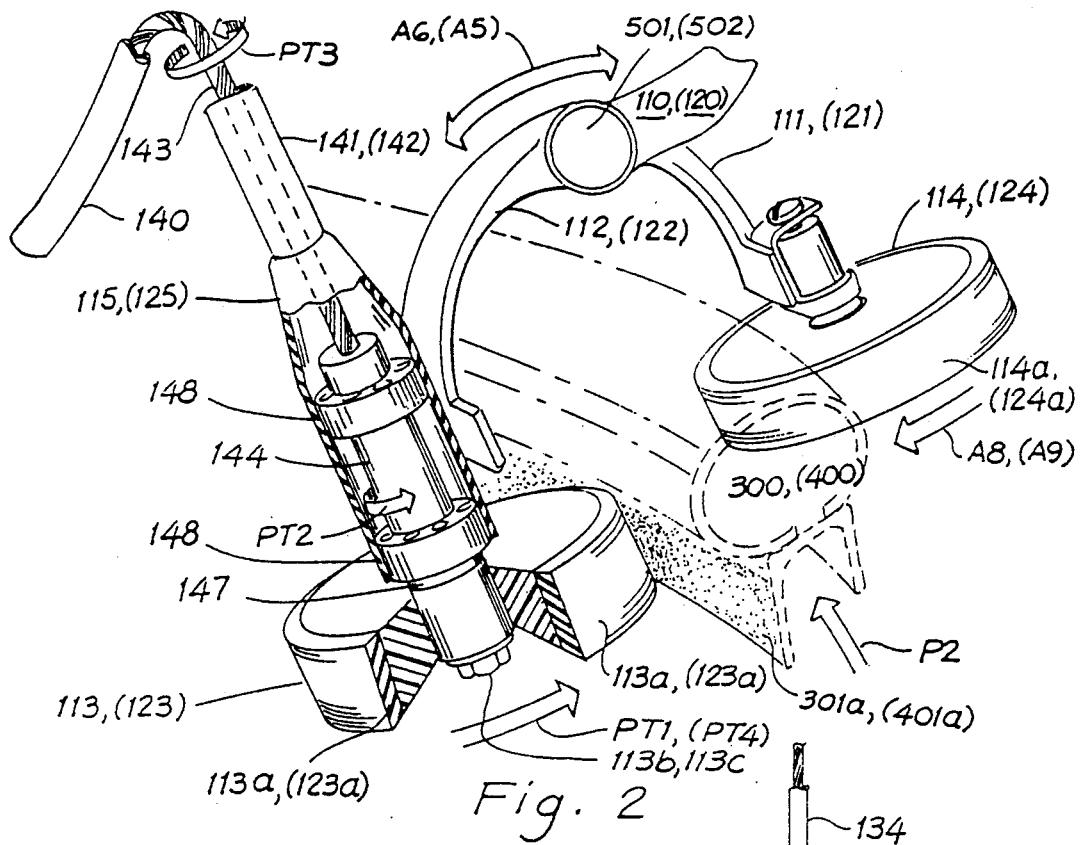
FIG. 2 is an enlarged perspective cutaway view of a driver caliper means (typical of either driver or receiver caliper means), showing a driver idler (or receiver idler) coacting with an auxiliary second idler that aids in maintaining uniform pressure on the sidewalls of a rotating rim and also showing the interface between the roller and the drive transfer cable.

Referring now to FIG. 2 showing primarily a first caliper means 110 functioning as a driver, but also showing common structural similarities with the second caliper means 120. By example, a distal end 141, (142) of drive means, 140, (133) includes a woven cable 143 that terminates at a crimped connection of shaft 144 enclosed in housing 115, (125), which shaft 144 is fixedly attached to roller idler 113, (123) by means of a raised key 147 on shaft 144, keyway 113c on roller idler 113 and associated attachment hardware 113b. Coacting with roller 113, (123) is an auxiliary idler 114, (124) hingedly coupled via levers 112, (122) and 111, (121) at attachment point 501, (502), see FIG. 1, for maintaining uniform rotary contact, as indicated by arrows PT1, A8, (PT4, A9), with rim surfaces 301a, (401a) upon receiving actuating action A6, (A5).

Figure 3:
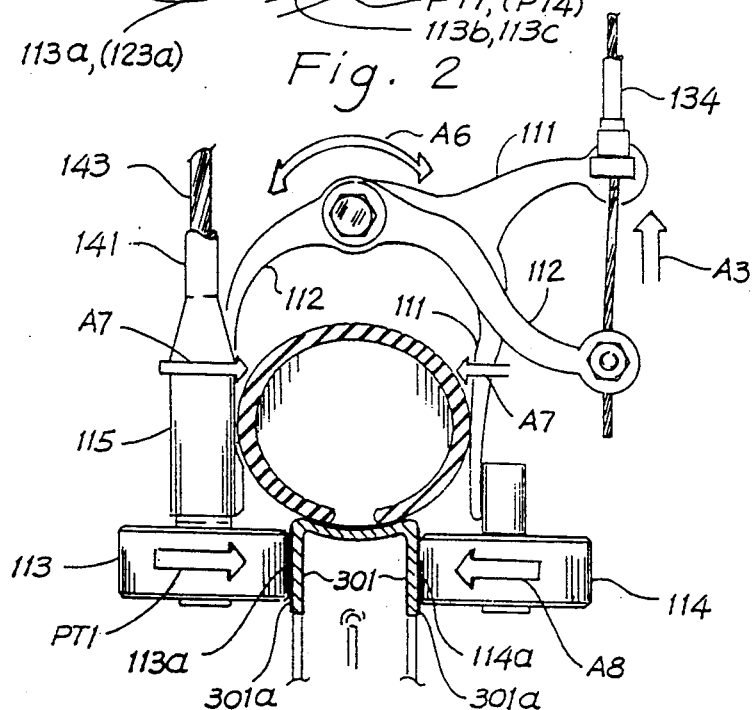
FIG. 3 is a cross-sectional view taken along line 3—3 in FIG. 1 illustrating engagement of the driver idler and the auxiliary second idler with the sidewall of the rim member on the pedal driven wheel.

In application of the apparatus as shown in FIG. 1, a rider of bicycle B activates a pedal drive system 200 by rotatably pedaling on pedal 201, as indicated by arrow P1, that drives chain 201 to propel wheel 300 as indicated by arrow P2. The motion produced by propulsion P2 results in follower action of wheel 400 as indicated by arrow P3, due to normal pedal action P1. Upon demand caused by the riding conditions, bicycle B may tend to slow down due to loss of traction, a rider may then choose to activate power distribution and transfer apparatus 100 by action A1 on actuating means 130 which hingedly draws on sheath cables 133 and 134, as generally indicated by arrows A2 and A3, which arrows are shown as bi-directional due to the return action possible on actuating means 130. As best seen in FIG. 3, the drawing action A3 on cable 134 causes clamping or pincer action A6 on levers 111 and 112 that urges both rollers 113 and 114 toward rim surface 301a of rim 301, as indicated by arrow A7, which urging action A7 causes frictional contact between roller surfaces 113a and 114a and rim surface 301a and the freewheeling motion A8 on idler 114 and a rotary power transfer motion on drive idler 113, shown as arrow PT1. Thus, when roller friction surfaces 113a and 114a come into contact with rim surface 301a of wheel 300 rotating as indicated by arrow P2, roller 113 is caused to rotate as indicated by arrow PT1, shaft 144 also rotates about bearings 148, as indicated by arrow PT2, which in turn causes cable 143 to rotate as indicated by arrow PT3. As best seen in FIG. 1, rotation PT3 results in rotation PT4 at the other end of cable 143 that is fixedly connected to receiver roller 123. Roller 123 also has a friction roller surface 123a that controllably contacts a rim friction surface 401a on the non-driven wheel 400. That, due to rotation PT4, produces a driving force P3 on wheel 400.

Therefore, while the present invention has been shown and described herein in what is believed to be the most practical and preferred embodiments, it is recognized that departures can be made therefore within the scope of the invention, which is therefore not to be limited to the details disclosed therein but is to be accorded the full scope of the claims so as to embrace any and all equivalent apparatus.

I claim:

1. A power transfer apparatus for imparting motion to a follower, said apparatus comprising:

first caliper means having a driver idler for engaging a rotating body, said rotating body being a rotary power source;

drive means coupled to said driver idler for transferring drive motion from said rotating body;

second caliper means having a receiver idler coupled to said drive means for engaging said drive motion to said follower; and actuator means coupled to said first and second caliper means for controlling engagement of said driver and receiver idlers, said follower comprising a non-driven wheel of a bicycle and said rotating body comprising a pedal driven wheel of said bicycle, and said driver idler comprises a first roller member that rotatably engages a side wall portion of a rim member associated with said pedal driven wheel, and said receiver idler comprises a receiver roller member that rotatably engages a side wall portion of a rim member associated with said non-driven wheel, each of said first and second caliper means further including a second idler coacting with corresponding said driver and receiver idlers in a pincer-like manner to effect engagement to said rotating body and to said follower, respectively, upon being actuated by said actuator means, each of said second idlers and each of said driver and receiver roller members having a contact surface consisting of a frictional material that effects rotatable engagement with said side wall portions of said rim members.

2. A power transfer apparatus as recited in claim 1 wherein:

said drive means includes a cable assembly mechanically coupled at one end to said driver idler and at other end to said receiver idler, said cable assembly being mounted to a frame member of said bicycle that interconnects said pedal driven wheel to said non-driven wheel.

3. A power transfer apparatus as recited in claim 1 wherein:

said actuator means comprises a short, pivoting grip handle member mounted on a steering handle bar member of said bicycle, said grip handle having respective ends of a first and second cable connected to a movable portion of said grip handle and respective other ends connected to corresponding lever members of said first and second caliper means.

4. A power transfer apparatus for imparting motion to a follower, said apparatus comprising:

first caliper means having a driver idler for engaging a rotating body, said rotating body being a rotary power source;

drive means coupled to said driver idler for transferring drive motion from said rotating body;

second caliper means having a receiver idler coupled to said drive means for engaging said drive motion to said follower; and actuator means coupled to said first and second caliper means for controlling engagement of said driver and receiver idlers, each of said first and second caliper means further includes a second idler coacting with corresponding said driver and receiver idlers in a pincer-like manner to effect engagement to said rotating body and to said follower, respectively, upon being actuated by said actuator means.

5. A wheel driven vehicle apparatus having controllable power transfer drive, said apparatus comprising:

at least one driven wheel member;

at least one non-driven wheel member, said driven wheel member and said non-driven wheel member being interconnected by a frame structure, said frame structure having a steering member;

first caliper means having a driver idler for engaging said at least one driven wheel member, said first caliper means being mounted proximate to said at least one driven wheel member;

drive means coupled to said driver idler for transferring drive motion from said at least one driven wheel member;

second caliper means having a receiver idler coupled to said drive means for engaging said drive motion to said non-driven wheel member; and actuator means coupled to said first and second caliper means for controlling engagement of said driver and receiver idlers, each of said first and second caliper means further including a second idler coacting with corresponding said driver and receiver idlers in a pincer-like manner to effect engagement to said at least one driven wheel member and to at least one non-driven wheel member, respectively, upon being actuated by said actuator means.

6. A wheel driven vehicle apparatus as recited in claim 5 wherein:

said driver idler comprises a first roller member that rotatably engages a side wall portion of a rim member associated with said driven wheel member; and said receiver idler comprises a receiver roller member that rotatably engages a side wall portion of a rim member associated with said non-driven wheel member.

7. A wheel driven vehicle apparatus as recited in claim 5 wherein:

said drive means includes a cable assembly mechanically coupled at one end to said driver idler and at other end to said receiver idler, said cable assembly being mounted to said frame structure; and said actuator means comprises a short, pivoting grip handle member mounted on said steering member, said grip handle having respective ends of a first and second cable connected to a movable portion of said grip handle member and respective other ends connected to corresponding lever members of said first and second caliper means.

8. A wheel driven vehicle apparatus having controllable power transfer drive, said apparatus comprising:

at least one driven wheel member;

at least one non-driven wheel member, said driven wheel member and said non-driven wheel member being interconnected by a frame structure, said frame structure having a steering member;

first caliper means having a driver idler for engaging said at least one driven wheel member, said first caliper means being mounted proximate to said at least one driven wheel member;

drive means coupled to said driver idler for transferring drive motion from said at least one driven wheel member;

second caliper means having a receiver idler coupled to said drive means for engaging said drive motion to said non-driven wheel member; and actuator means coupled to said first and second caliper means for controlling engagement of said driver and receiver idlers, said driver idler comprises a first roller member that rotatably engages a side wall portion of a rim member associated with said driven wheel member; and said receiver idler comprises a receiver roller member that rotatably engages a side wall portion of a rim member associated with said non-driven wheel member, each of said first and second caliper means further including a second idle coacting with corresponding said driver and re ver idlers in a pincer-like manner to effect engagement to said driven wheel member and to said non-driven wheel member, respectively, upon being actuated by said actuator means, each of said second idlers and each of said driver and receiver roller members having a contact surface consisting of a frictional material that effects rotatable engagement with said side wall portions of said rim members.

9. A method of transferring power to impart motion to a follower, said method comprising the steps of:

(a) providing a power transfer apparatus, said apparatus comprising:

first caliper means having a driver idler for engaging a rotating body, said rotating body being a rotary power source;

drive means coupled to said driver idler for transferring drive motion from said rotating body;

second caliper means having a receiver idler coupled to said drive means for engaging said drive motion to said follower; and actuator means coupled to said first and second caliper means for controlling engagement of said driver and receiver idlers, each of said first and second caliper means further including a second idler coacting with corresponding said driver and receiver idlers in a pincer-like manner to effect engagement to said rotating body and to said follower, respectively, upon being actuated by said actuator means;

(b) engaging said driver idler and associated second idler to said rotating body to produce said drive motion in said drive means;

(c) transferring said drive motion via said drive means to said receiver idler; and (d) engaging said receiver idler and associated second idler to impart motion to said follower.

* * * * *